(12) United States Patent
Kurz

(10) Patent No.: US 9,909,328 B2
(45) Date of Patent: Mar. 6, 2018

(54) USE OF A FEED-THROUGH FOR INSTALLATION IN A WALL OR FLOOR ELEMENT

(71) Applicant: Hauff-Technik GmbH & Co. KG, Hermaringen (DE)

(72) Inventor: Ralf Kurz, Giengen (DE)

(73) Assignee: Hauff- Technik GmbH & Co. KG, Herbrechtingen (DE)

( * ) Notice: Subject to any disclaimer, the term of this patent is extended or adjusted under 35 U.S.C. 154(b) by 0 days.

(21) Appl. No.: 15/113,522

(22) PCT Filed: Jan. 8, 2015

(86) PCT No.: PCT/EP2015/050226
§ 371 (c)(1),
(2) Date: Jul. 22, 2016

(87) PCT Pub. No.: WO2015/110290
PCT Pub. Date: Jul. 30, 2015

(65) Prior Publication Data
US 2017/0009470 A1    Jan. 12, 2017

(30) Foreign Application Priority Data
Jan. 23, 2014    (EP) .................................... 14152281

(51) Int. Cl.
*E04G 15/00* (2006.01)
*E04G 15/06* (2006.01)
*F16L 5/02* (2006.01)

(52) U.S. Cl.
CPC .............. *E04G 15/061* (2013.01); *F16L 5/02* (2013.01)

(58) Field of Classification Search
CPC ....... E04G 15/06; E04G 15/061; E04G 17/06; F16L 15/02; F16L 15/10; F16L 15/04; F16L 27/12; E04B 1/946; E04C 2/049
See application file for complete search history.

(56) References Cited

U.S. PATENT DOCUMENTS 3,523,552 A * 8/1970 Ogden .................. E04G 15/061
137/592
4,079,912 A * 3/1978 Haydock .................. B28B 7/30
249/184
4,365,784 A * 12/1982 De Stasio ............. B28B 7/0094
249/139

(Continued)

FOREIGN PATENT DOCUMENTS

DE          29922263 U1    4/2011
GB           2450700 A     1/2009
WO       2007082364 A1    7/2007

*Primary Examiner* — Beth A Stephan
(74) *Attorney, Agent, or Firm* — Wood, Phillips, Katz, Clark & Mortimer

(57) ABSTRACT

The invention relates to a feed-through member (1) which is to be mounted in a wall element or floor element and comprises a tube element (2) that includes a first (23) and a second (24) tube element section. Said tube element sections (23, 24) can be moved relative to one another in the conducting direction (21) in such a way that the length of the tube element (2) is adjustable, a blocking mechanism (26, 32; 51, 61) being provided which at least partly prevents the tube element sections (23, 24) from moving when same are in the relative positions.

14 Claims, 11 Drawing Sheets

(56) References Cited

U.S. PATENT DOCUMENTS

| | | | | |
|---|---|---|---|---|
| 4,480,855 | A | * | 11/1984 | Rosenbaum ........ F16L 37/0985 285/3 |
| 4,596,340 | A | * | 6/1986 | Luther ................ B65D 21/086 220/8 |
| 5,405,119 | A | | 4/1995 | Maguire |
| 5,509,240 | A | * | 4/1996 | Barton, Jr. ........... E04G 15/061 285/363 |
| 7,877,941 | B2 | * | 2/2011 | Fischer ................ E04G 15/061 174/64 |
| 8,188,382 | B2 | * | 5/2012 | Monden ............... E04G 15/061 174/505 |
| 8,689,503 | B2 | * | 4/2014 | Fischer ................ E04G 15/061 52/220.8 |
| 8,707,641 | B2 | * | 4/2014 | Rummelhoff ............ B28B 7/30 249/184 |
| 9,086,174 | B2 | * | 7/2015 | McConnell ............... F16L 5/02 |
| 9,103,116 | B2 | * | 8/2015 | McConnell ............... E04B 5/48 |
| 2003/0009961 | A1 | * | 1/2003 | Radke ...................... F16L 5/04 52/220.1 |
| 2004/0104498 | A1 | * | 6/2004 | Schneider ............... B28B 7/342 264/31 |
| 2011/0036038 | A1 | * | 2/2011 | von Rummelhoff ..... B28B 7/30 52/577 |
| 2014/0260015 | A1 | * | 9/2014 | McConnell ............... F16L 5/02 52/232 |

* cited by examiner

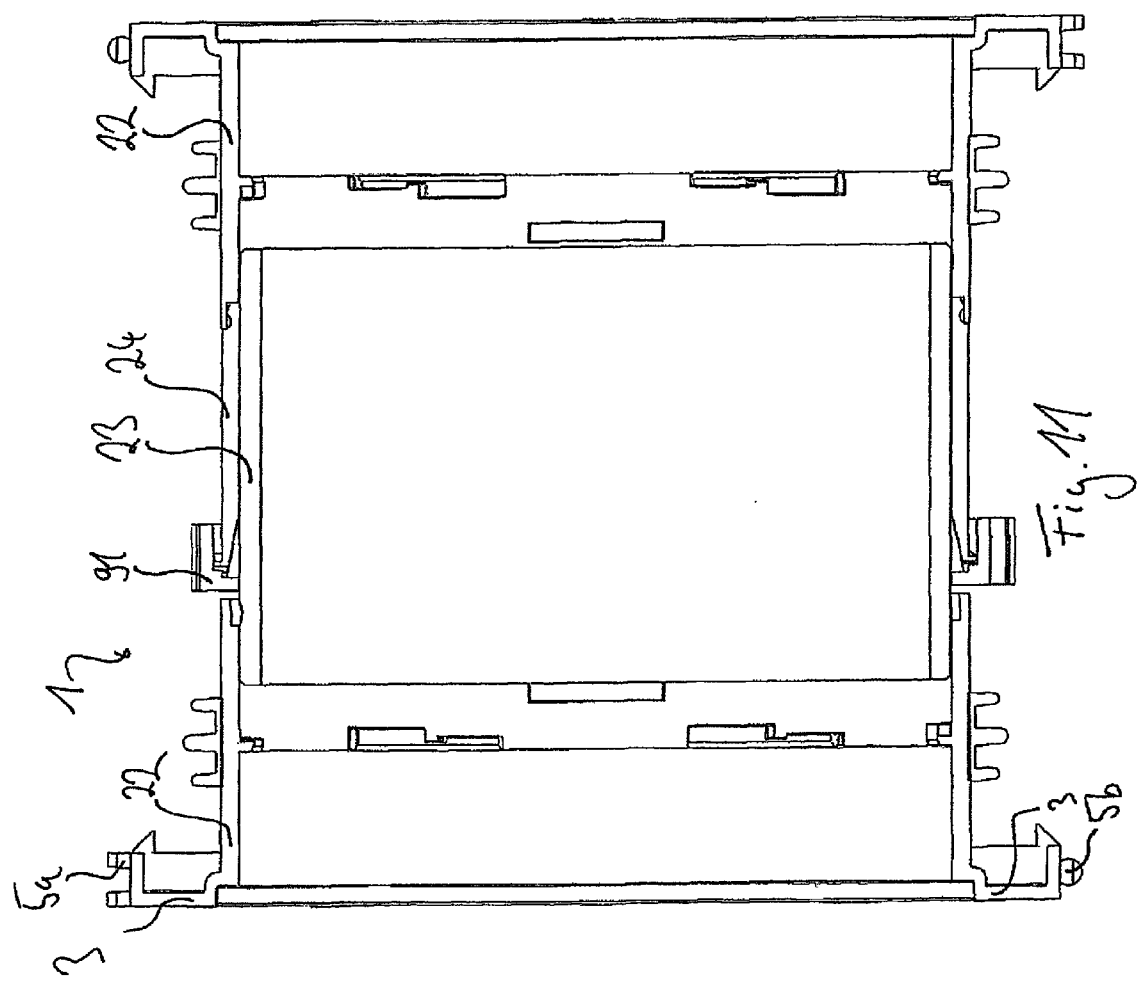

USE OF A FEED-THROUGH FOR INSTALLATION IN A WALL OR FLOOR ELEMENT

FIELD OF THE INVENTION

The present invention relates to the use of a duct provided for an insertion into a wall or floor element, having a tube element through which a line can be fed through.

BACKGROUND OF THE INVENTION

According to the prior art, for instance in case of so-called manhole liners, tube elements made of fiber cement are provided, which keep clear a through-opening in a wall or floor element after casting in concrete. Therethrough, a line can be fed subsequently and can be sealed against the tube element. Further developments relate to a substitution of the tube elements made of fiber cement by tube elements made of metal or also a synthetic material.

The problem the present invention is to solve is to provide a duct having improved use properties.

BRIEF SUMMARY OF THE INVENTION

According to the invention, the problem is solved by a duct for an insertion into a wall or floor element and for feeding through a line, having a tube element which is provided for extending through said wall or floor element in a line direction, wherein said tube element comprises a first tube element piece and a second tube element piece, said tube element pieces being displaceable with respect to each other in said line direction and being arrangeable in a plurality of different relative positions to each other thus, so that a length of said tube element, taken in said line direction, is adjustable, wherein a locking device is provided, which locks said displaceability of said tube element pieces in said relative positions.

Preferred embodiments are provided in the dependent claims and the following description which relates to the duct and its use at the same time; at least implicitly, the disclosure relates to all claims categories.

The length of the tube element of a duct according to the invention can be adjusted in length, wherein this adjustability can be locked. The inventor found out that it is the locking mechanism which makes the adjustability in length interesting from a practice point of view. For instance, a duct being only adjustable in length can be disadvantageous, because significant forces can act on the tube element during the casting in concrete; without a locking device, the tube element pieces can be displaced with respect to each other unintendedly which can result in a leakage finally. Later on, water can propagate along the outside of the tube element for instance and enter unintendedly.

The locking device can also improve the handling of the duct, for instance when the latter is mounted at a formwork. Then, for instance, one end of the tube element can be mounted at a formwork member and the length of the tube element can be adjusted thereafter and locked, wherein the duct is more or less stable even before being fixed to the opposing formwork member. The tube element pieces do not slip with respect to each other so that the risk of one of them dropping down and being damaged is reduced.

The tube element pieces are displaceable with respect to each other in the line direction so that they can be brought into different relative positions, each of them corresponding to another tube element length. The length of the tube element is taken in the line direction from its one end to its opposite end (in case of a beveled end, for instance, the "length" is a mean value of all lengths). Therein, a displaceability in terms of this invention requires that the length of the tube element is changed thereby; in case of a shorter tube element piece being completely inserted into a longer tube element piece, the displacement of the former in the latter is no displacement in terms of this invention. Preferably, the displacement of the tube element pieces takes place in the line direction only, wherein the tube direction of each tube element piece is parallel to the line direction.

In case of a preferred duct, the tube element made of the two tube element pieces is supplemented by at least one further mounting tube element, fixture elements being provided further preferred at the mounting tube element for a fixture at a formwork and/or other ducts. Particularly preferred, such a fixture element is provided at an end of the mounting tube element with respect to the line direction, for instance as a flange plate extending in the distance direction. Therein, the flange plate itself can be used for a fixture at the formwork, for instance by screwing together or nailing. The "distance direction" is the direction defining the distance to a center axis of the conduit, which is the radial direction in case of a circular shape (accordingly, the line direction is the axial direction then).

Further, preferably, a form-fit element is provided at the fixture element, which can be used for connecting the duct to a further duct. Therein, the form-fit element is preferably provided twice, namely as a first form-fit element and a second form-fit element complementary to the first one, wherein, during the assembly of two ducts, the first form-fit element of one of the ducts engages by a form-fit with the second form-fit element of the other duct and vice versa. The form-fit elements can engage in a tongue- and groove-like manner, preferably by an undercut.

Seen in the line direction, the fixture element (the flange plate) preferably has a polygonal outer shape so that the fixture element can be assembled with correspondingly polygonal fixture elements of further ducts in a manner supplementing each other to an area. A basically rectangular, in particular quadratic, outer shape is preferred.

The first and the second tube element piece and a mounting tube element piece, if provided, typically have a length taken in the line direction of at least 5 cm, 10 cm or 15 cm, respectively; possible upper limits can for instance be 100 cm, 75 cm or 50 cm, respectively. Possible inner diameters can for instance be at least 5 cm or 7.5 cm, and not more than 50 cm, 30 cm or 20 cm.

The term "duct" relates to tube element pieces assembled in such a way that the resulting tube element is sealed against liquid concrete or water and that a line can be led through.

In a preferred embodiment, the second tube element piece receives the first one, the latter being displaceably guided in the second tube element piece. For instance, an outer wall area of the first tube element piece can contact an inner wall area of the second tube element piece area by area, namely basically as far as inserted. For practical reasons, the guidance can have a certain backlash with respect to the distance direction.

Even though tube element pieces being correspondingly displaceable in each other are preferred, this is not required for the length adjustment in the most common sense of the invention; for instance, an elastically deformable connecting piece could be provided between the tube element pieces, for instance in form of expansion bellows. Insofar the two tube element pieces could also be one-piece with each other.

However, preferably two tube element pieces being one-piece respectively and being guided in each other then are provided.

The locking device locks the displaceability (in particular a displaceability as just described) which is considered as locking "at least partly" in the context of this disclosure, namely at least up to applying a certain minimum force being larger than the force required for the displacement otherwise. For instance, a minimum force in the line direction for overcoming the locking device can be at least the 2-, 4-, 6-, 8- or 10-fold of a force applied during the displacement in the line direction. Therein, this shall preferably apply for both line directions respectively, namely for a lengthening and a shortening; in general, the locking preferably relates to both line directions.

As shown with the exemplary embodiments in further detail, the locking can be implemented in predefined relative positions or stepless, namely in any relative position. At least 3 lockable relative positions shall be provided, preferably at least 5 and further preferred at least 10 (which relates to both, predefined and relative positions that can be reached stepless).

In a preferred embodiment being particularly preferred in case of a stepless lockability, a locking ring is provided for the locking, which can be brought into a locking position and locks the relative position of the first and the second tube element piece then, preferably tensions the second tube element piece onto the first one, namely presses it on. In the locking position, the locking ring is in this case provided on the outside of the second tube element piece and pushes the latter inwards. (In the absence of a contrary note, the terms "inside"/"inwards" and "outside"/"outwards" relate to the distance direction in the context of this disclosure.)

In a preferred embodiment, the locking ring can be brought into the locking position by a screwing movement, namely is guided by a bearing on the outside of the first and/or second tube element piece, preferably at the second tube element piece only, the locking ring being guided in such a way that turning the locking ring in a circumferential direction causes a displacement in the line direction. With an increasing displacement in the line direction, the second tube element piece can for instance be tensioned increasingly inwards onto the first tube element piece, for instance in case of a second tube element piece having an outer area extending outwards obliquely.

For this purpose, a threaded portion can be provided at the outside of the tube element piece(s) or at the inside of the locking ring, preferably at the locking ring and at the tube element pieces or in particular the second tube element piece. With respect to the circumferential direction (the turning direction), a plurality of threaded portions are provided preferably, each of them extending in the circumferential direction over an angular range of for instance at least 10°, preferably at least 20°, and (independently of the lower limit) over not more than 180°, preferably not more than 120°. With respect to the line direction, such a threaded portion is, in the angular range at a corresponding part (locking ring or tube element piece), preferably the only threaded portion respectively.

Preferably, a threaded portion is provided at the locking ring and a threaded portion complementary to the former is provided at the tube element piece (preferably at the second one), the threaded portions engaging with each other; as mentioned, particularly preferred, a plurality of such threaded portions engaging with each other pairwise are provided over the circumference. However, in general, the "screwing guidance" could be also realized by a trunnion or by an elevation without a threaded shape at one part, which results in a screwing guidance when interacting with a threaded portion at the other part.

In general, an additional locking can be provided for the locking ring which can be brought into the locking position by a screwing movement, for instance like a bayonet catch; then, the screwing movement would be locked in the locking position and could for instance be released by pushing in the line direction (opposite to the direction in which the locking ring is moved thereafter upon releasing).

In another preferred embodiment, the locking ring guided on the outside of the second tube element piece can be brought into the locking position by just moving it in the line direction (thus, no screwing movement of which only a component of motion is directed in the line direction is required). This can simplify the handling and also the design of the locking ring; also in view of the cost, a simple, closed ring extending continuously in the circumferential direction can be preferred.

In a preferred embodiment, the outer surface of the second tube element piece extends outwards obliquely in a tensioning section, the tensioning section being for instance provided at least in a section or as a whole in the shape of a truncated cone. When the locking ring is brought into the locking position, the tensioning section is tensioned increasingly inwards due to the slope, namely is moved towards the outer surface of the first tube element piece and/or is pushed against it with an increasing pressure.

In a preferred embodiment, the second tube element piece is made of a rather stiff synthetic material for achieving a good stability when casting in concrete, the synthetic material having for instance a Shore hardness (Shore D, in the whole disclosure) of at least 70 Shore, 80 Shore or 90 Shore, wherein the tensioning section is further preferred made of the same material monolithically with the remaining second tube element piece. For achieving a certain flexibility towards the first tube element piece nevertheless, the tensioning section is preferably parted into tensioning tongues by parting lines (also independently of the Shore values just mentioned).

Therein, a parting line extends from one end of the second tube element piece in direction to the opposite end but ends distant to the latter; in the distance direction, the parting line extends through completely. Since a plurality of parting lines are provided, for instance at least six, eight, ten or twelve parting lines, the extension of a tensioning tongue is correspondingly small in the circumferential direction (relating to a circumference around the center axis of the line) and each tensioning tongue can be moved correspondingly well.

For improving this movability further, a transition region between a respective tensioning tongue and the remaining tube element piece, which can act as a hinge to some extent, can also be provided with a reduced wall thickness. The wall thickness taken in the distance direction can for instance be reduced by a groove extending in the circumferential direction, preferably a groove arranged on the inside of the tube element piece.

In a preferred embodiment, relating to a screwable locking ring but also to a locking ring that can be moved in the line direction solely, a sealing member is provided which is tensioned by the locking ring and seals then between the first and the second tube element piece. Namely, the sealing member extends continuously in the circumferential direction and contacts an outer lateral surface of the first tube element piece; further, it can for instance contact the inner lateral surface and/or an end on the face of the second tube element piece. In the locking position, the locking ring causes a certain deformation of the sealing member or presses the latter on so that a possible gap between the outer lateral surface of the first tube element piece and the inner lateral surface of the second tube element piece is sealed.

A sealing member having the shape of a wedge in at least a portion is preferred, the wedge shape being increasingly pushed on during the displacement in the line direction (which is caused by the locking ring, preferably by a screwing movement of the latter). Such a sealing member can for instance contact the first tube element piece by an inner surface extending in the line direction and can contact an inner surface section of the second tube element piece by an outer surface extending outwards obliquely, preferably can contact an inner surface section of the second tube element piece extending outwards obliquely in a manner complementary to the sealing member. When the sealing member is displaced in the line direction then, preferably by a screwing movement of the locking ring, the outer surface of the sealing member is guided at the inner surface section of the second tube element piece and the sealing member is increasingly pushed against the latter and against the outer surface of the first tube element piece.

In a preferred embodiment, the displaceability of the locking ring (independently whether screwable or displaceable by a movement in the line direction only) is limited by a stop, for instance a stop provided at the end of the second tube element; for instance a flange projecting outwardly can be provided (not necessarily circumferentially). In the end position, the tensioning can be maximal as well, for instance due to a sloped outer surface of the second tube element piece as described above. For a fitter, the stop can indicate a reliable locking.

A preferred embodiment of a second tube element piece in which a first one is guided displaceably relates to a second tube element piece partitioned into a tube section and a contact section being one-piece with the latter. The tube section is made of a rather stiff synthetic material which can for instance withstand the forces occurring during the casting in concrete and which in general shows rather no deformation upon the application of a force. By providing for the contact section a material softer in comparison to the material of the tube element, a good sealing contact between the second and the first tube element piece can be reached nevertheless and for instance water propagating along the outside of the tube element can be prevented from entering.

The "softer" material of the contact section can for instance have a Shore hardness being by at least 10%, preferably at least 20% or 30% smaller than the Shore hardness of the material of the tube section. In general, the tube and the contact section can for instance be made of the same synthetic material having a different degree of cross-linking in the two sections. However, preferably, the two sections are made of a different synthetic material respectively, wherein the two synthetic materials are molded one against the other in a molding process, for instance in case of a two-component injection molding part.

The contact section can for instance be made of a thermoplastic elastomer, preferably of TPE or TPS (TPE based on styrol block copolymers).

For the tube section, a synthetic material comprising for instance polycarbonate, polyamide, polystyrol, polymethylmethacrylate, polyethylenterephthalate, polybutylene terephthalate, acrylester-styrol-acrylnitrile or styrol-acrylnitrile as a component can be provided. These materials can also be preferred for the first tube element piece and/or a mounting tube element described above; likewise, a corresponding material can also be provided for a second tube element piece being not partitioned into the tube and the contact section as just described.

The tube element piece made of the tube section and the contact section softer in comparison to the former can for instance be interesting in case of an aforementioned locking ring pushing the contact section on in its locking position. Further, the "softer" contact section can also be combined with a catch mechanism advantageously and comprise or be a contact collar projecting inwardly. The contact collar can engage in circumferential recesses provided on the outside of the first tube element piece, defining the relative positions spaced to each other in the line direction.

A corresponding catch mechanism can also be of interest independently of a "softer" contact section being provided. Thus, a contact collar projecting inwardly and engaging in recesses at the first tube element piece can also be made of the same material as the remaining second tube element piece, in general even in case of a rather stiff tube element piece.

A preferred embodiment relates to a second tube element piece made as a whole of a softer material in comparison to the first tube element piece. For instance, the second tube element piece can be made of a synthetic material having a Shore hardness of not more than 50 Shore, 60 Shore or 70 Shore; for instance, the Shore hardness can be smaller than that of the first tube element piece by at least 10%, 20% or 30%. Preferably, this embodiment relates to a monolithic second tube element piece made of a continuous material, for instance apart from particles distributed randomly therein. "Monolithic" means continuous without a material boundary (to another material or a material section having been manufactured otherwise). In this case, a monolithic second tube element piece shall be made of a softer material than the first tube element piece which is preferably monolithic as well.

Therein, in a further embodiment, the second tube element piece is made of a rubber material, particularly of a synthetic rubber material. The synthetic rubber material can for instance comprise styrene, butadiene, styrene-acrylic, pure acrylic or venyl acetate as a component. The second tube element piece can for instance be manufactured by pressing rubber material in a mould and curing of the rubber material therein, for instance by pressing in a mould by at least 80 bar, 90 bar or 95 bar (and for instance 110 bar or 105 bar at maximum), for instance at a temperature of at least 170° C., 180° C. or 190° C. (and 210° C. or 200° C. at maximum). Alternatively, the "softer" second tube element piece can also be manufactured by injection molding and can for instance be provided of a thermoplastic elastomer, for instance TPE or TPS.

A particularly preferred embodiment of the "softer" second tube element piece relates to its mounting at the remaining duct, namely at a mounting tube element opposite to the first tube element piece. Namely, the second tube element piece (being softer in comparison) can be widened slightly and pulled onto the mounting tube element. By the second tube element piece engaging, with respect to the line direction, behind a projection of the mounting tube element projecting outwardly, an additional anti-slip protection is possible. In particular, such a projection can be a sealing bar extending circumferentially at the outside of the mounting tube element, for instance a sealing bar being one-piece with the remaining mounting tube element, for instance a sealing bar molded onto with a softer material by two-component injection molding.

In this case, the sealing function of the sealing bar towards the wall of floor element is at least not worsened significantly by covering it partly with the second tube element piece, because the latter is also rather soft and can contact the wall or floor element in a spring-like manner to some extent. A second tube element piece embracing the sealing bar partly can also be advantageous because the second tube element piece is sealed well against the mounting tube element due to the contact to the sealing bar (being rather soft). A sealing provided on the outside of a product commercially available (the sealing being actually provided for sealing against the wall or floor element) can be used for sealing against a tube element piece used for a lengthening of the mounting tube element.

A preferred embodiment relates to a tube element closed at both ends. A corresponding closure is not necessarily provided at each tube element piece itself but can for instance also be arranged at a mounting tube element attached respectively. For instance, a mounting tube element can be provided at both ends respectively, the two tube element pieces being arranged in between with respect to the line direction. Therein, the two mounting tube elements can be closed by a closure respectively, for instance a closure that can be inserted and locked in a bayonet-like manner, for instance to prevent humidity from entering.

The inventors found out that the length adjustability of a tube element closed at both ends is at least more difficult because air can stream out and in only to a certain extent. Removing a closure for the purpose of the length adjustment can however be disadvantageous even in case of a closure that can be re-inserted, because it results in additional mounting effort and the closure can get dirty on the construction site, resulting in a reduced functionality.

Therefore, according to the invention, a ventilation channel is opened between two relative positions so that there is a fluidic connection from the inside of the tube element outwards between two relative positions. Between two relative positions, a corresponding flow cross-section through which air can enter or exit can for instance be by at least the 2-, 4-, 6-, 8- or 10-fold larger than in the relative positions; preferably, the duct is sealed in the relative positions to an extent being technically possible. This embodiment is considered as an invention also independently of the features of claim 1 and shall be disclosed independently of a locking device being provided or not; therein, nevertheless, combinations with other features of this disclosure not relating to the locking device are possible.

A preferred embodiment of the ventilation channel relates to a second tube element piece having a contact collar projecting inwardly, which contacts the first tube element piece (which is guided displaceably in the second one). Therein, a contact area between the contact collar and a first tube element piece extends continuously with respect to the circumferential direction in the relative positions, namely as a closed line or area extending circumferentially around the first tube element piece. However, between the relative positions, the contact area is interrupted. Thus, for instance, an elevation lifting the contact collar between two relative positions and/or a deepening interrupting the contact area locally between two relative positions can be provided on the outside of the first tube element piece.

In a preferred embodiment, a ventilation groove having an extension in the line direction is provided on the outside of the first tube element piece—therein, it extends at least also in the line direction, but not necessarily in the line direction solely. Therein, the ventilation groove does not only extend between the relative positions but also into the latter. In other words, the ventilation groove intersects elevations which are provided as a part of the catch mechanism between the relative positions and merges into the deepenings of the catch mechanism in the relative positions. During the length adjustment, the contact collar is lifted by the elevation of the catch mechanism between two relative positions, wherein the elevation is interrupted by the ventilation groove so that a venting channel is formed. Likewise, the catch and the venting mechanism can be combined in a particularly advantageous manner.

In general, for sure, it is not necessarily only a single venting channel opened, instead, a plurality of venting channels can be provided circumferentially distributed, for instance at least three, four or five.

A further embodiment which is also considered as an invention independently of the locking device and shall be disclosed accordingly relates to an anti-rotation device allowing the displaceability of the tube element pieces in the line direction but blocking a rotation of the two with respect to each other (a rotation with respect to the circumferential direction, namely relating to a circumference around the center axis of the line). Likewise, the mounting can be simplified for instance in case of mounting elements provided at the ends of the tube elements and being held in an appropriate arrangement with respect to each other.

Preferably, the anti-rotation device is provided as a projection at one of the two tube element pieces, the projection extending in the line direction and being guided in a corresponding guiding groove at the other one of the two tube element pieces. Particularly preferred, the projection is provided at the second tube element piece and oriented inwardly, wherein the guiding groove is provided at the outside of the first tube element piece.

The invention also relates to the use of a duct disclosed, namely for an insertion into a wall or floor element. Therein, pourable material, namely material being liquid with a certain viscosity, preferably concrete or mortar, is arranged around the tube element. The material hardens then and holds the tube element of the duct enclosed (with respect to the circumferential direction), holding the duct in the wall or floor element thus. Therein, the wall or floor element can be manufactured with this process, for instance in case of a duct mounted at a formwork, wherein the wall or floor element is casted then, the duct being casted into the latter thereby.

BRIEF DESCRIPTION OF THE DRAWINGS

Below, the invention is explained in further detail by exemplary embodiments, wherein the disclosure relates to all claims categories and the features can be relevant for the invention also in a different combination.

In detail, it shows

FIG. 11 the duct according to FIG. 9 with another length adjusted.

DETAILED DESCRIPTION OF THE PREFERRED EMBODIMENTS

Figure 1:
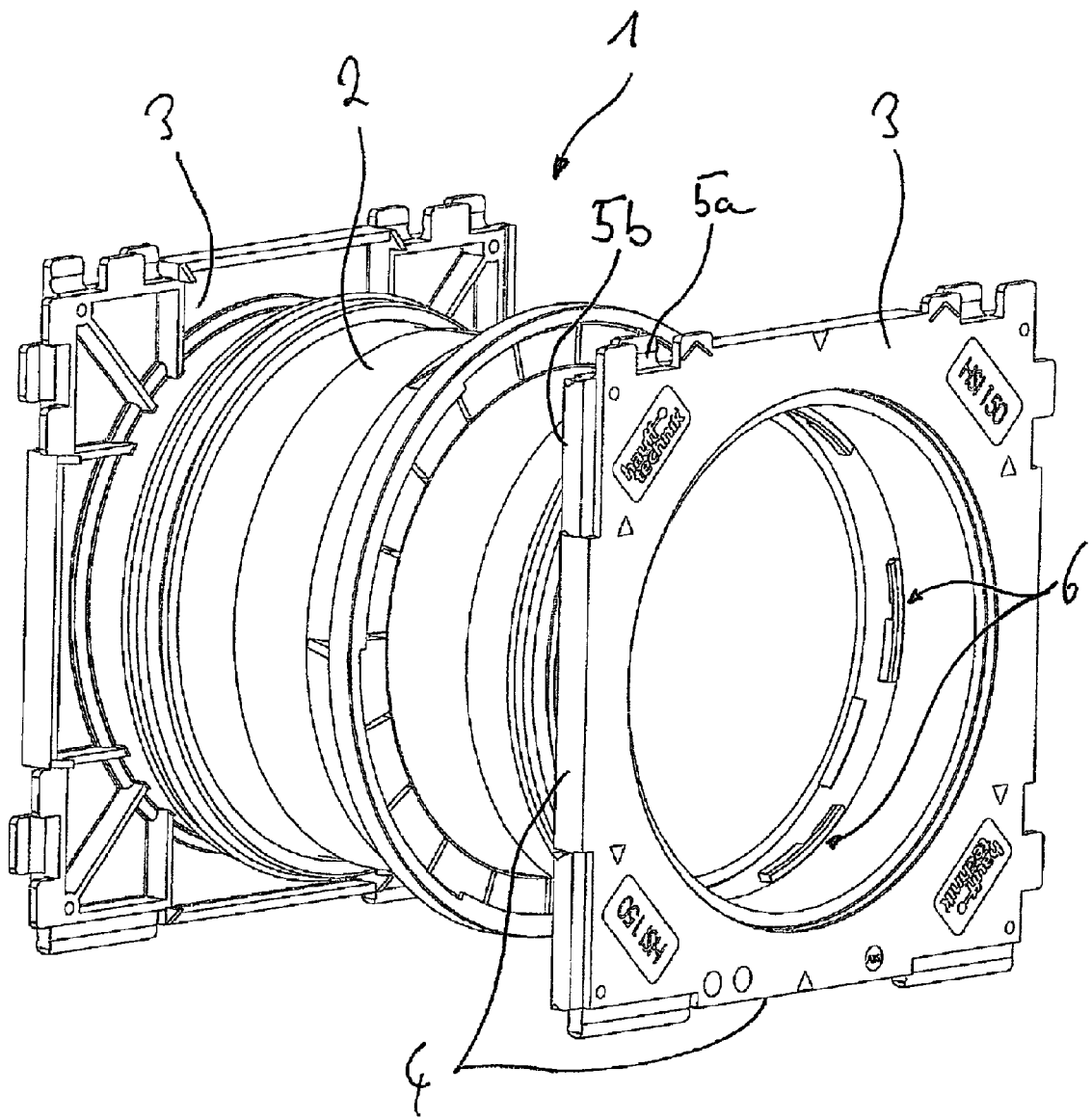
FIG. 1 a first duct according to the invention in an oblique view.

FIG. 1 shows a duct 1 according to the invention for an insertion into a wall, the duct having a tube element 2. At both ends of the tube element 2, a flange plate 3 is provided respectively as a fixture element. After the insertion of the duct 1 into the wall, the two flange plates 3 lie adjacent to the respective wall area by their outer front face respectively, the tube element 2 keeping clear a through-opening between the two sides of the wall then. Prior to the casting, the duct can be mounted at the formwork by the flange plates 3, for instance by nailing or screwing together with the formwork elements which the flange plates 3 contact with their front faces. Then, the formwork is filled up with concrete and the formwork elements are removed after the latter has hardened.

At the side edges 4 of the flange plates 3, respectively in an edge region, connection elements are provided, namely groove 5a and tongue elements 5b engaging each other in a form-fit manner. The tongue elements 5b can engage in the groove elements 5a of a further duct 1 and the groove elements 5a can receive tongue elements 5b of a further duct 1 so that a plurality of ducts can be assembled in a module-like manner, the tube elements 2 extending in parallel.

Inside the tube element 2, a bayonet mechanism 6 is visible, which helps mounting an inset in the through-opening by a turning movement, wherein the inset can for instance be a closure closing the tube element 2 during the casting in the wall or a functional inset sealing later on against a line led through.

Figure 2:
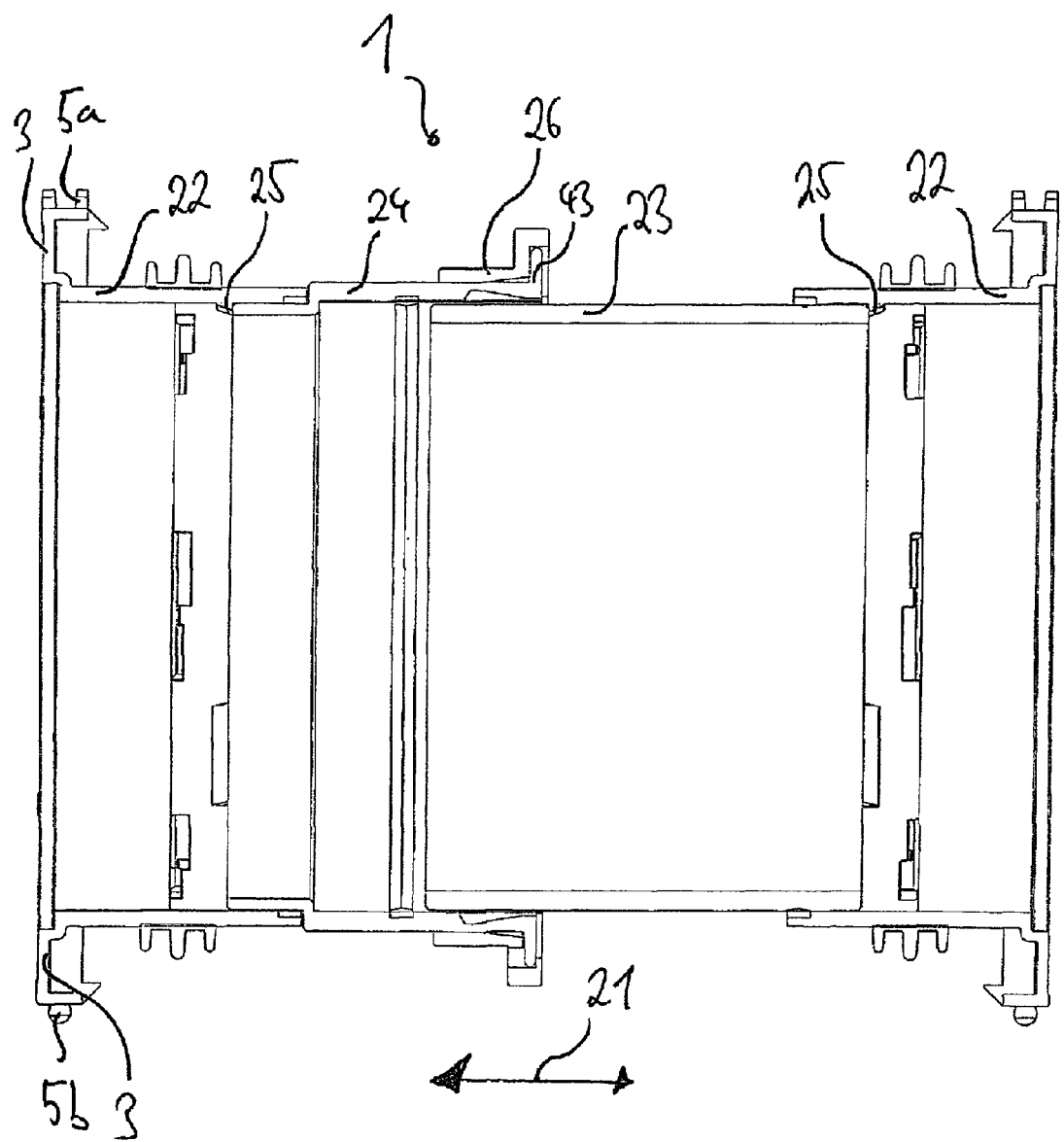
FIG. 2 the duct according to FIG. 1 in a sectional side view.

FIG. 2 shows the same duct 1 in a sectional side view, the sectional plane containing the line direction 21. At both ends with respect to the line direction 21, the flange plates 3 having the connecting elements 5a,b are visible. Further, in this illustration, the construction of the tube element 2 is visible in further detail, the tube element being assembled from four tube parts being one-piece respectively. At each end, a mounting tube element 22 respectively comprising a flange plate 3 formed monolithically therewith is provided.

Between the two mounting tube elements 22, two tube element pieces explained in further detail below are provided. Therein, a first tube element piece 23 is inserted into a second tube element piece 24 and is guided displaceably in the latter in the line direction 21 (within certain boundaries). By displacing the two tube element pieces 23, 24 with respect to each other, the length of the tube element 2 taken in the line direction 21 can be modified and adapted to different wall thicknesses thus. The mounting tube elements 22 are respectively pushed up to a stop 25 onto the first 23 or second tube element piece 24, their relative position thereto being defined respectively. By displacing the two tube element pieces 23, 24 with respect to each other, also the mounting tube elements 22 are displaced with respect to each other.

Figure 3:
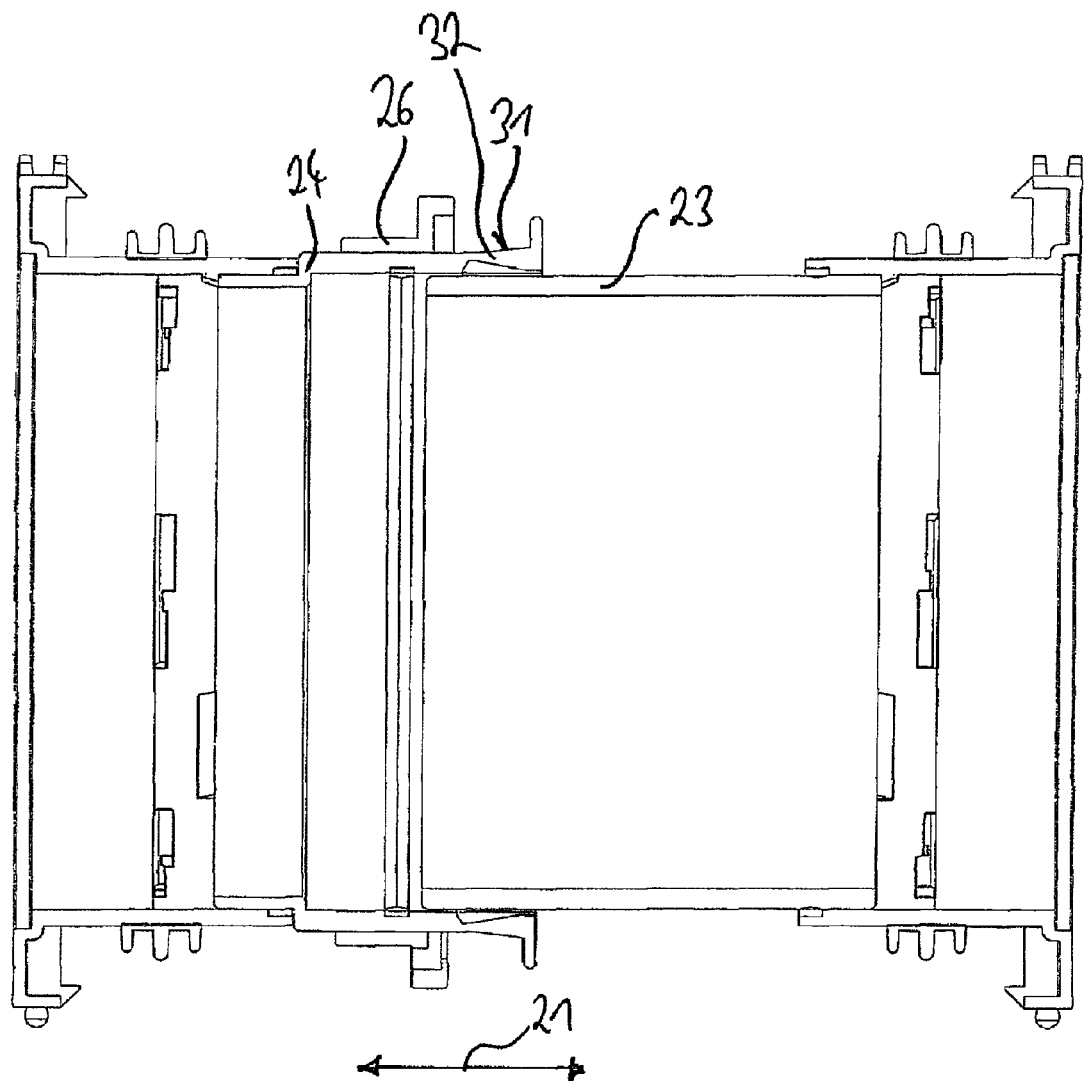
FIG. 3 an illustration corresponding to that of FIG. 2 wherein the locking device is disengaged in comparison thereto.

For locking the displaceability of the tube element pieces, a locking ring 26 is provided on the outside of the second tube element piece 24 and guided thereon. In FIG. 2, the locking ring 26 is shown in its locking position, it pushes the second tube element piece 24 against the first one 23 and locks the displaceability of the tube element pieces thus. In comparison thereto, in FIG. 3, the locking ring 26 is shown in a position allowing the displaceability of the tube element pieces. Thus, the locking ring 26 is spaced to that end of the second tube element piece 24 into which the first tube element piece 23 is pushed in. Likewise, the second tube element piece 24 is not pushed against the first one 23, a length adjustment being possible.

A region of the outer surface 31 of the second tube element piece 24 extends, where the locking ring 26 is placed in the locking position, slightly outwards obliquely, namely tilted with respect to the line direction 21. Consequently, when being brought from the position shown in FIG. 3 to the locking position according to FIG. 2, the locking ring 26 pushes the second tube element piece 24 (in detail, the tensioning section 32 thereof) onto the first tube element piece 23 by an increasing pressure.

Figure 4:
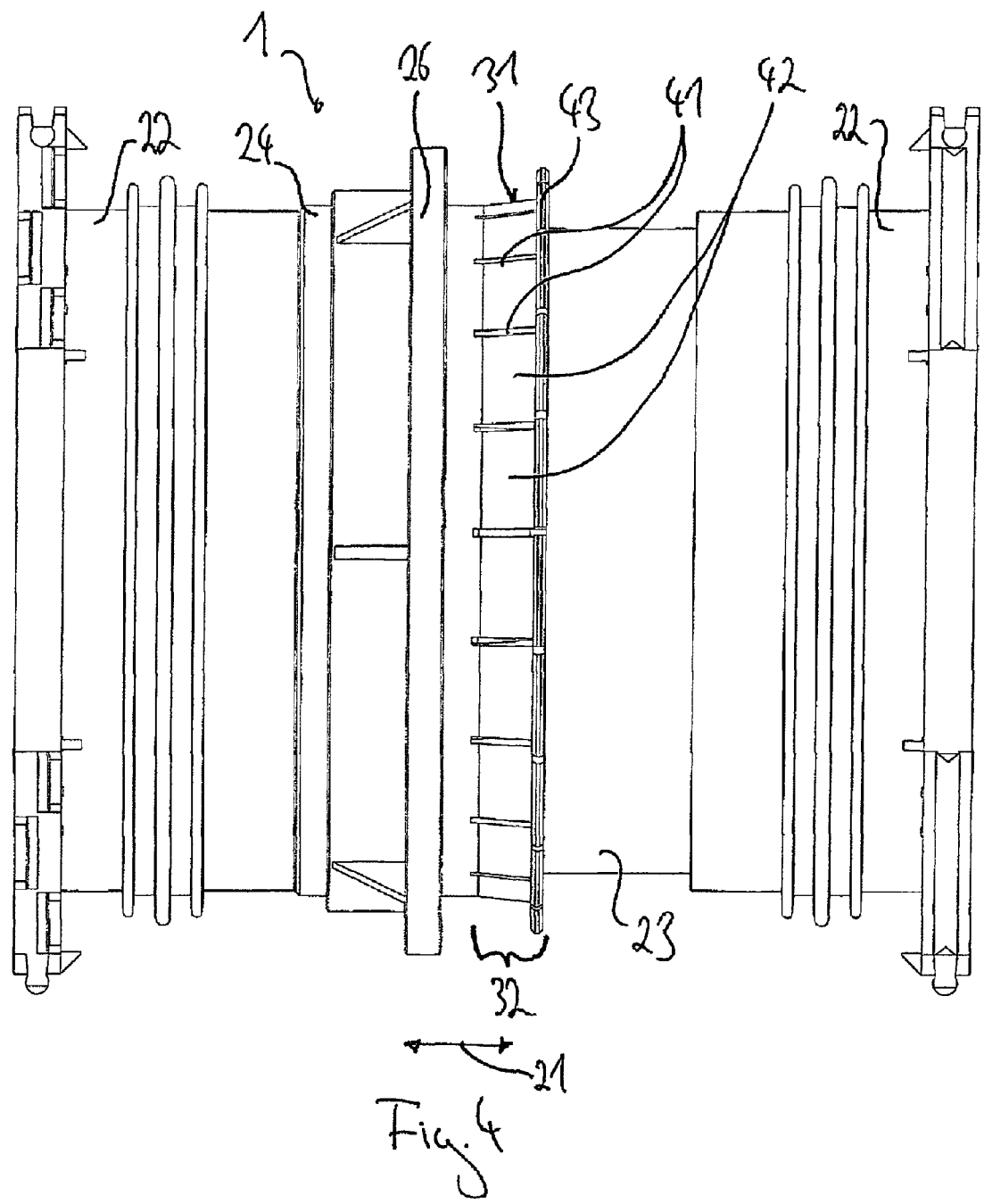
FIG. 4 the situation of FIG. 3 in a non-sectional side view.

From FIG. 4 showing the duct 1 in a non-sectional side view, the construction of the tensioning section becomes apparent in further detail. In the tensioning section 32, the second tube element piece 24 is parted into tensioning tongues 42 by parting lines 41 extending in the line direction 21. The partitioning into the tensioning tongues 42 simplifies or allows the movability of the second tube element piece 24 in the tensioning section, namely in radial directions so to say in distance direction, which simplifies pushing it on.

For the displaceability of the locking ring 26, a stop 43 is provided at the second tube element piece 24 in the locking position. When the locking ring 26 is pushed up to the stop, the tensioning and the locking thus is maximal which allows a good handling of the locking device for a user.

Figure 5:
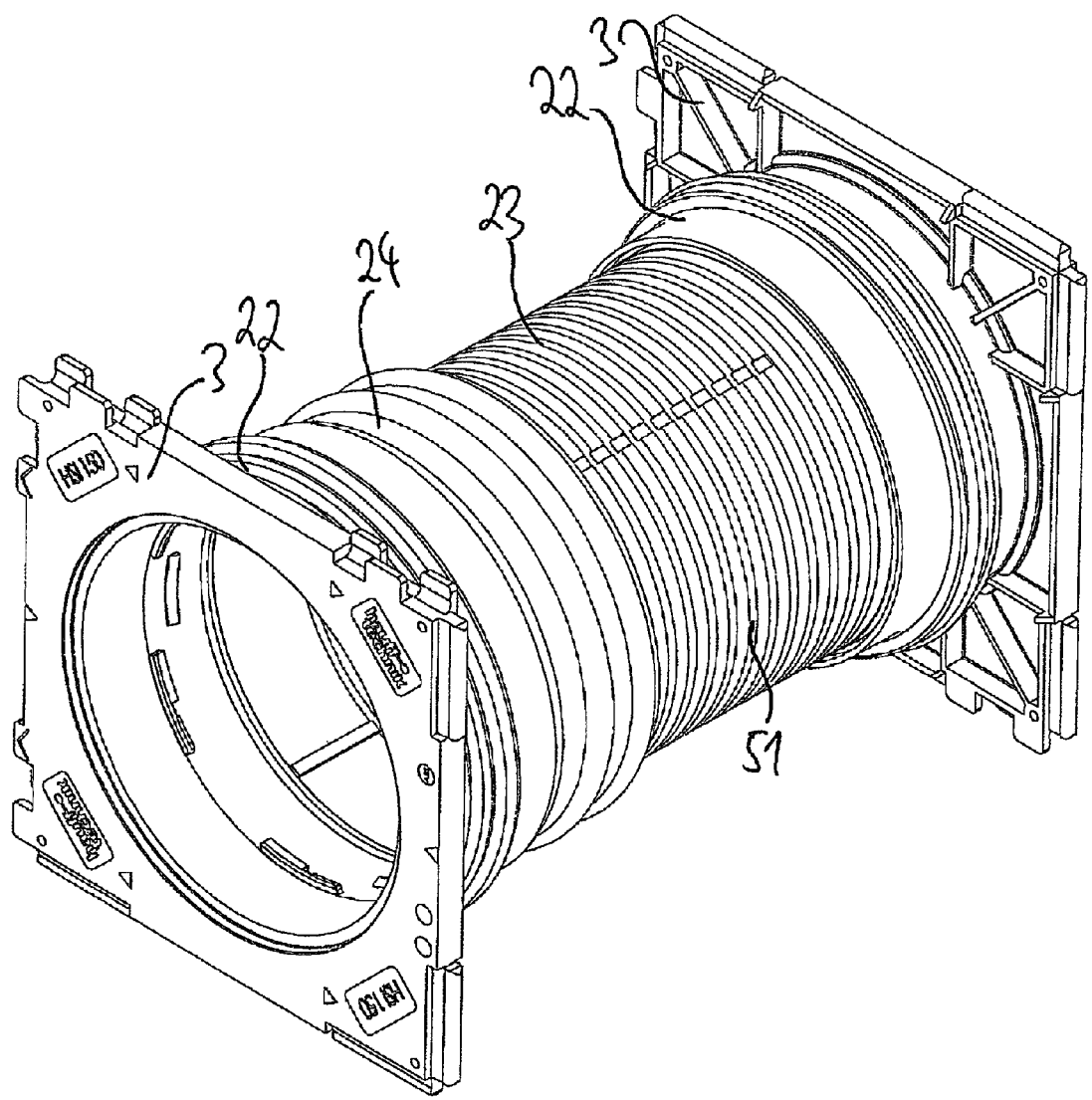
FIG. 5 a second duct according to the invention in an oblique view.

FIG. 5 shows a further duct 1 having mounting tube elements 22 with flange plates 3 at both ends again. Insofar, reference is made to FIGS. 1 to 5 with the respective explanations. However, the duct 1 according to FIG. 5 differs from the one described above, namely in the construction of the first tube element piece 23 and the second one 24.

Figure 6:
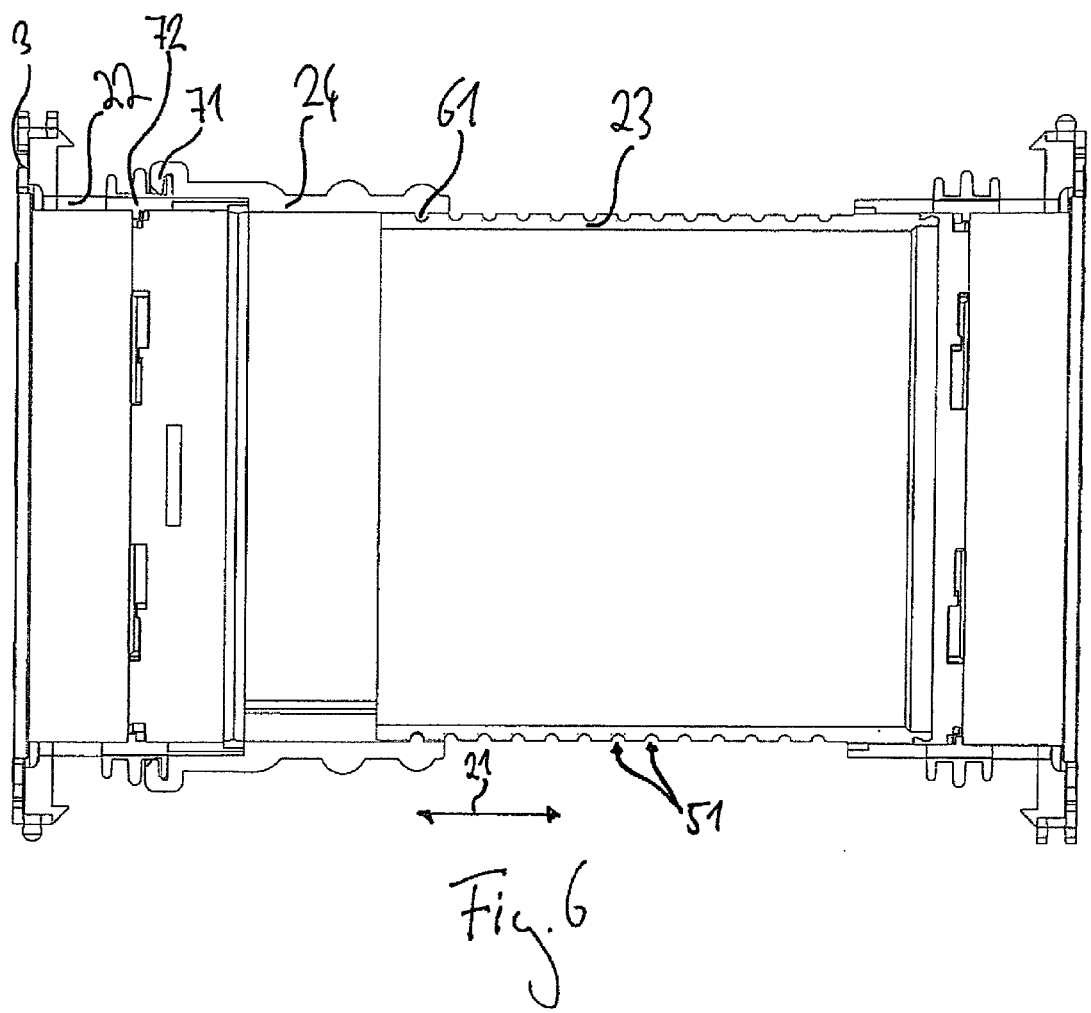
FIG. 6 the duct according to FIG. 5 in a sectional side view.

On the one hand, in this case, no locking ring is provided for locking, the locking function being realized by a catch mechanism instead. For this purpose, on the outside of the first tube element piece 23, recesses 51 are provided circumferentially, wherein a projection 61 projecting inwardly and provided at the second tube element piece 24 rests in the recesses in the relative positions, see FIG. 6.

Figure 7:
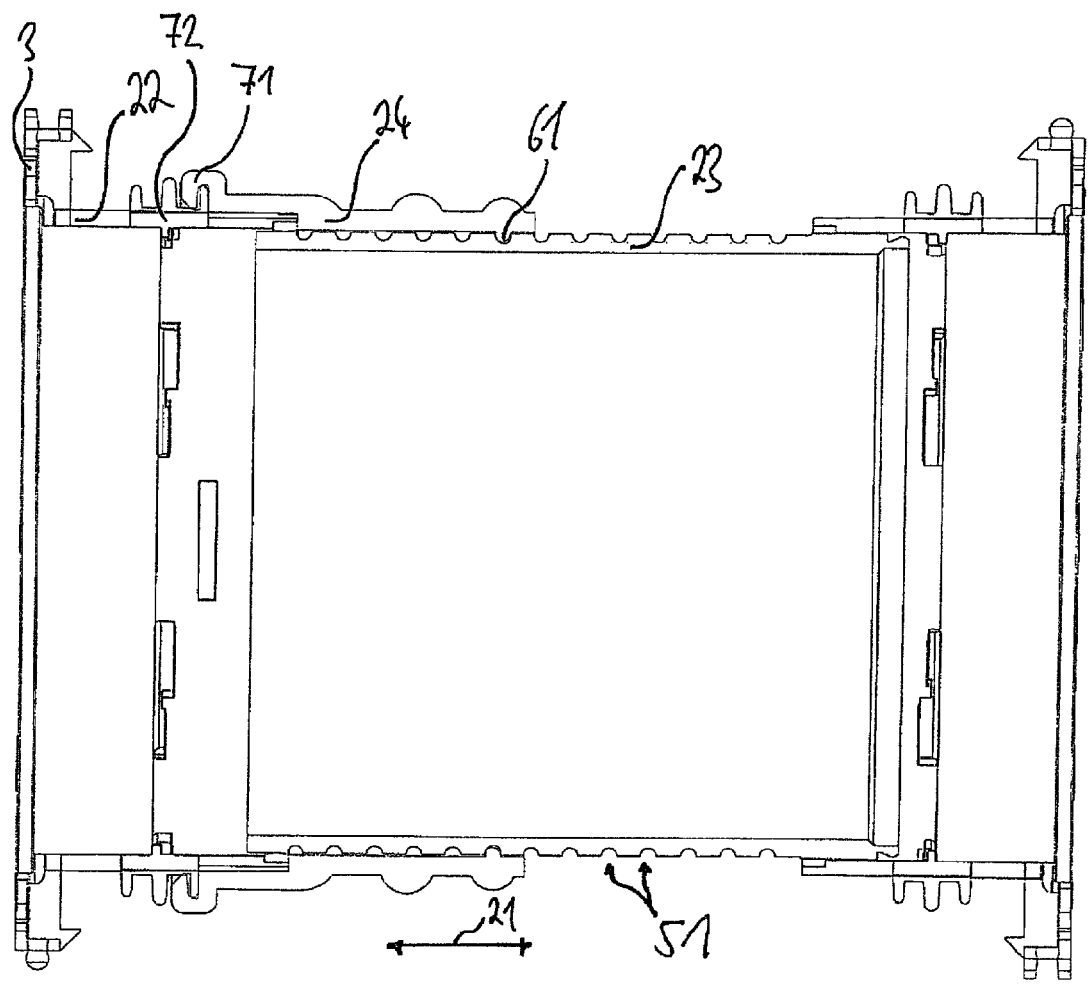
FIG. 7 the duct according to FIGS. 5 and 6 with another length adjusted.

The second tube element piece 24 is made of EPDM wherein the first tube element piece 23 is an ABS-injection molded part. The second tube element piece 24 has a Shore hardness of 50 Shore which is about 44% smaller than that of the first tube element piece 23 having a Shore hardness of about 90 Shore. Consequently, on displacing the two tube element pieces 23, 24 with respect to each other, the second tube element piece 24 can deform slightly outwards until the projection 61 rests in a recess 51 corresponding to the next relative position respectively. In the situation shown in FIG. 6, the tube element 2 is adjusted to the maximal length whereas FIG. 7 shows an adjustment with a shorter length.

For a mounting of the second tube element piece 24 at the corresponding mounting tube element 22 (the left one in FIGS. 6 and 7), a form-fit element 71 is provided at its end lying opposite to the end with the projection 61, the form-fit element 71 partly embracing a sealing bar 72 formed one-piece with the mounting tube element 22. The sealing bar 72 is made of a thermoplastic elastomer by two-component injection molding, namely is casted onto the remaining mounting tube element 22 made of ABS, wherein the sealing bar seals against the wall after the insertion into the latter. The form-fit element 71 embraces one of the three bars of the sealing bar 72 so that the second tube element piece 24 is secured against a slipping in the line direction 21.

Figure 8:
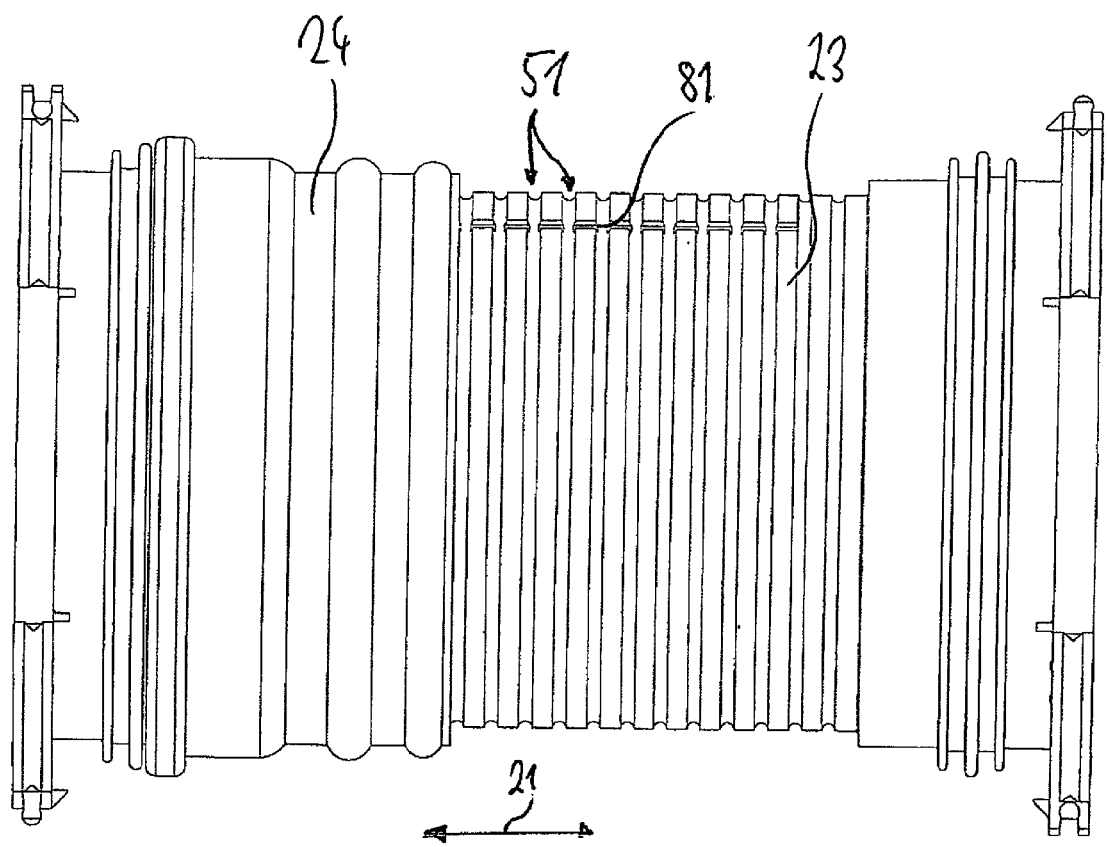
FIG. 8 the duct according to FIGS. 5 to 7 in a non-sectional side view.

In the non-sectional side view of FIG. 8, a further feature of the duct 1 is visible, namely a ventilation groove 81 provided on the outside in the first tube element piece 23. The ventilation groove extends in the line direction 21 over the relative positions, namely intersects the elevations between the deepenings 51 of the catch mechanism. Therein, the bottom of the guiding groove is at the same height with a respective bottom of a deepening 51 (with respect to the distance direction) so that the projection 61 has a sealing circumferential contact in a deepening.

However, between the relative positions, the ventilation groove 81 defines a ventilation channel through which air can stream when the two tube element pieces 23, 24 are pushed towards each other or pulled in the opposite direction, namely when the two mounting tube elements 22 are respectively sealed by a closure air-tight basically.

Figure 9:
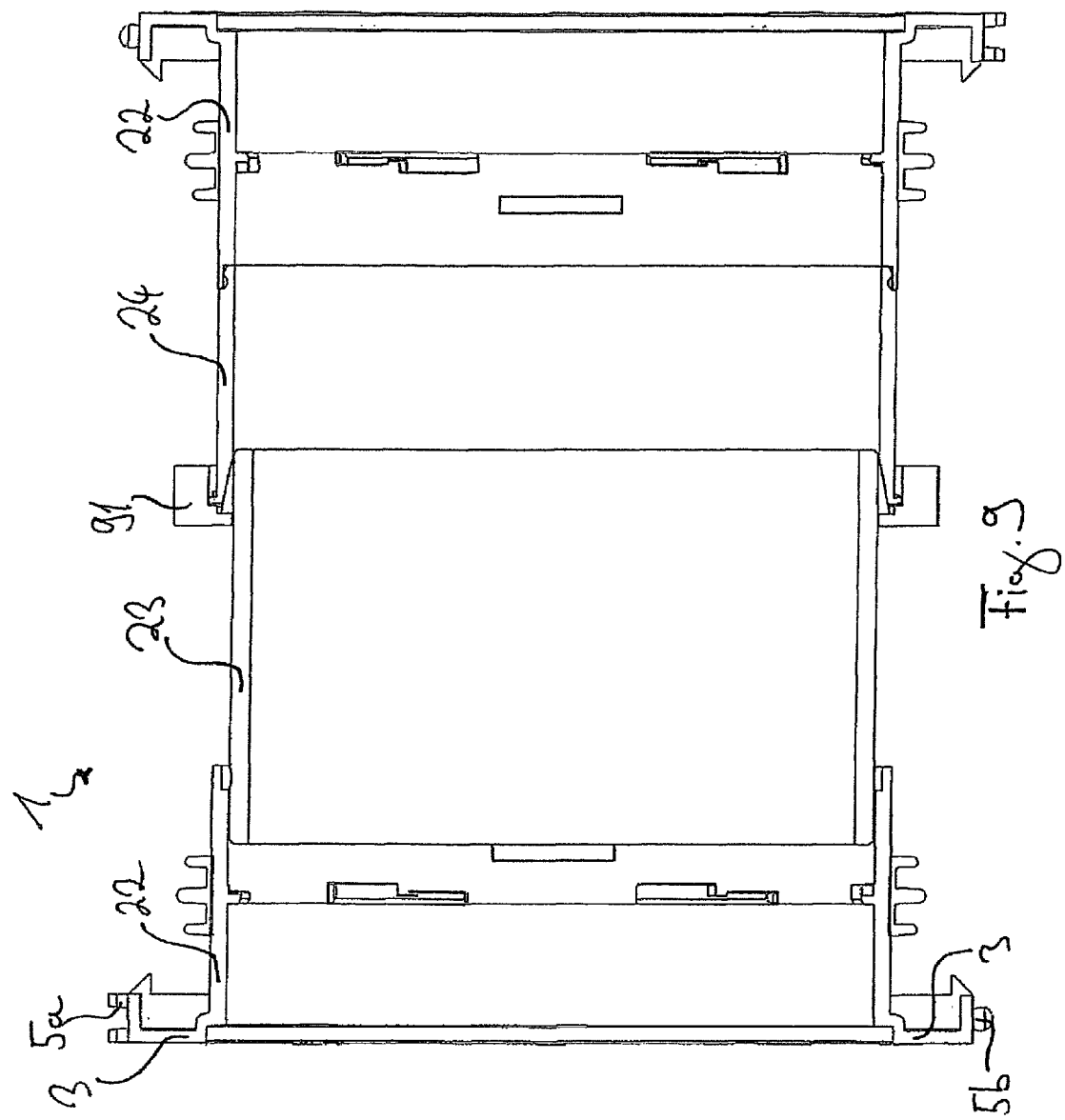
FIG. 9 a third duct according to the invention in a sectional side view.

FIG. 9 shows a further duct 1 according to the invention wherein the design of the mounting tube elements 22 corresponds to those of the ducts discussed above. Similar to the duct 1 according to FIGS. 1 to 4, a locking ring 91 is provided, the design of the locking ring being different from that of the first duct 1 however. The locking ring 91 is guided by a screwing movement, namely is brought into the locking position by a turning movement.

Figure 10:
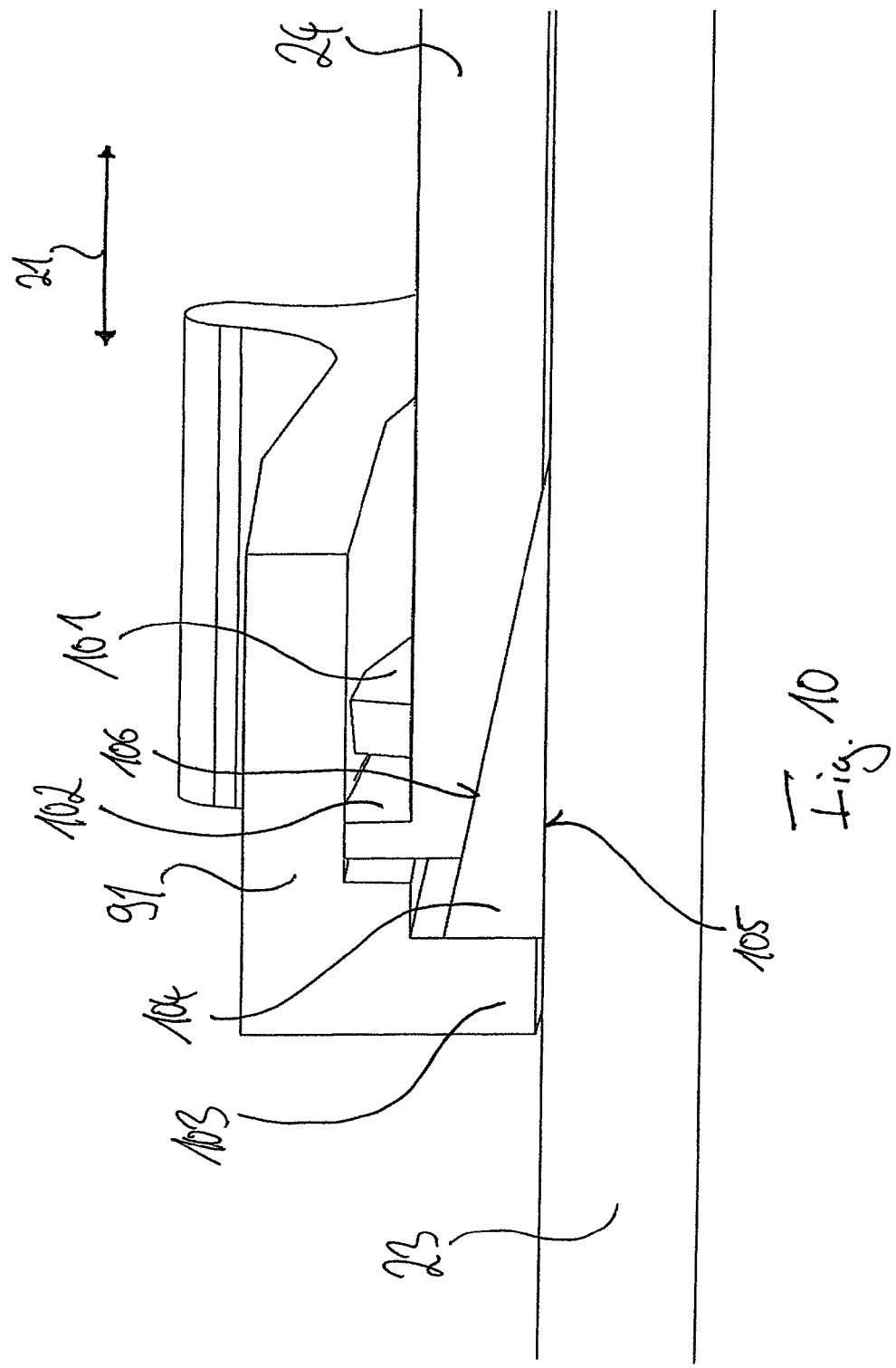
FIG. 10 the locking ring of the duct according to FIG. 9 in an enlarged illustration, namely also in a sectional side view.

FIG. 10 shows this locking ring 91 in detail. At the inside, namely facing the tube element pieces 23, 24, a threaded portion 101 is provided at the locking ring; distributed circumferentially, the locking ring 91 is provided with four of those threaded portions 101. When the locking ring 91 is brought into the locking position, each threaded portion 101 of the locking ring 91 contacts a respectively complementary threaded portion 102 on the outside at the second tube element piece 24.

When the locking ring 91 is turned circumferentially with respect to the second tube element piece 24, a relative movement between the second tube element piece 24 and the locking ring 91 results in the line direction 21 due to the contact of the threaded portions 101, 102 guided at each other. By turning the locking ring 91, the latter is pulled towards the second tube element piece 24.

A tensioning section 103 is formed at that end of the locking ring 91 lying opposite to the second tube element piece 24, the tensioning section pushing a sealing member 104 into a sealing position between the first 23 and the second tube element piece 24. The sealing member 104 contacts the first tube element piece 23 by an inner surface 105 extending in the line direction 21; by an outer surface 106 tilted outwards with respect to the line direction 21, the sealing member 104 contacts an inner surface section of the second tube element piece 24, the inner surface section being also tilted with respect to the line direction 21. When the locking ring 91 is brought into the locking position by turning, the tensioning section 103 pushes the sealing member 104 increasingly into the position between the first 23 and the second tube element piece 24 so that the two tube element pieces 23, 24 are sealed against each other.

FIG. 11 shows the duct 1 with another length adjusted, the two tube element pieces 23, 24 being maximally pushed into each other; thus, the minimal length of the duct 1 is adjusted (whereas FIG. 9 shows the maximal length).

What is claimed is:

1. A method for using in a duct (1) for an insertion into a wall or floor element and for feeding through a line, providing said duct (1) comprising a tube element (2) which is provided for extending through said wall or floor element in a line direction (21),
   wherein said tube element (2) comprises a first tube element piece (23) and a second tube element piece (24), said tube element pieces (23, 24) being displaceable with respect to each other in said line direction (21) and being arrangeable in a plurality of different relative positions to each other thus, so that a length of said tube element (2), taken in said line direction (21), is adjustable,
   wherein said first tube element piece (23) can be inserted into said second tube element piece (24) and is guided therein displaceable to enable said displaceability,
providing a locking device (26, 32; 51, 61) which locks said displaceability of said tube element pieces (23, 24) in said relative positions,
   wherein a locking ring (26, 91) is provided as said locking device (26, 32; 51, 61), which locking ring can be brought into a locking position for locking said displaceability of said tube element pieces, in which locking position said locking ring (26, 91) defines the relative position of said first (23) and said second tube element piece (24),
pouring a hardenable material which encloses said tube element (2) after the hardenable material has hardened,
   wherein, in said locking position, said locking ring (26, 91) tensions said second tube element piece (24) inwards onto said first tube element piece (23).

2. The method according to claim 1 wherein said pourable material which hardens is concrete or mortar.

3. The method according to claim 1, wherein said locking ring (91) can be moved into said locking position by a screwing movement, a corresponding screwing guidance (102) being provided on an outside of at least one of said first (23) and said second tube element piece (24).

4. The method according to claim 1, wherein said locking ring (26) is guided displaceable on an outside of the second tube element piece (24) and can be moved from a position which allows the displaceability of said tube element pieces (23, 24) into a locking position by just moving said locking ring in said line direction (21).

5. The method according to claim 1, wherein a sealing member (104) sealing between said first (23) and said second tube element piece (24) is tensioned by said locking ring (26, 91), preferably a sealing member (104) guided displaceable at said second tube element piece (24) in a wedge-like manner.

6. The method according to claim 1, wherein said second tube element piece (24) is partitioned into a tube section and a contact section being one-piece with said tube section, said contact section being adapted for contacting said first tube element piece (23) sealingly, thus being made of a material which is softer than a material of said tube section.

7. The method according to claim 1, wherein said locking device (26, 32; 51, 61) comprises a catch mechanism which catches in said relative positions and locks said displaceability of said tube element pieces.

8. The method according to claim 1, wherein an anti-rotation device is provided so that said tube element pieces (23, 24) can be displaced with respect to each other in said line direction (21) but are not rotatable with respect to each other in a circumferential direction, said anti-rotation device being preferably a projection at one of said two tube element pieces (23, 24), said projection extending in said line direction (21) and being guided in a guiding groove provided at the other one of said two tube element pieces (23, 24), said guiding groove extending in said line direction (21).

9. A method for using a duct (1) for an insertion into a wall or floor element and for feeding through a line,
providing said duct (1) comprising a tube element (2) which is provided for extending through said wall or floor element in a line direction (21),
wherein said tube element (2) comprises a first tube element piece (23) and a second tube element piece (24), said tube element pieces (23, 24) being displaceable with resect to each other in said line direction (21) and being arrangeable in a plurality of different relative positions to each other thus, so that a length of said tube element (2), taken in said line direction (21), is adjustable,
wherein said first tube element piece (23) can be inserted into said second tube element piece (24) and is guided therein displaceable to enable said displaceability,
providing a locking device (26, 32; 51, 61) which locks said displaceability of said tube element pieces (23, 24) in said relative positions,
wherein a locking ring (26, 91) is provided as said locking device (26, 32; 51, 61), which locking ring can be brought into a locking position for locking said displaceability of said tube element pieces, in which locking position said locking ring (26, 91) defines the relative position of said first (23) and said second tube element piece (24),
wherein said locking ring (26) is guided displaceable on an outside of the second tube element piece (24) and can be moved from a position which allows the displaceability of said tube element pieces (23, 24) into a locking position by just moving said locking ring in said line direction (21),
pouring a hardenable material which encloses said tube element (2) after the hardenable material has hardened,
wherein, in said locking position, said locking ring (26, 91) tensions said second tube element piece (24) inwards onto said first tube element piece (23), and
wherein an outer surface (31) extends, in a tensioning section (32) of said second tube element piece (24), obliquely outwards with respect to a direction defining a distance to a centre axis of said line so that said locking ring (26) tensions said tensioning section (32) of said second tube element piece (24) increasingly inwards when said locking ring is moved into said locking position.

10. The method according to claim 9, wherein said second tube element piece (24) is partitioned in said tensioning section (32) by parting lines (41) extending in said line direction (21), wherein said second tube element piece (24) is partitioned into tensioning tongues (42) by said parting lines (41), said tensioning tongues (42) having a mobility in the distance direction and being tensible inwards.

11. A method for using a duct (1) for an insertion into a wall or floor element and for feeding through a line,
providing said duct (1) comprising a tube element (2) which is provided for extending through said wall or floor element in a line direction (21),
wherein said tube element (2) comprises a first tube element piece (23) and a second tube element piece (24), said tube element pieces (23, 24) being displaceable with respect to each other in said line direction (21) and being arrangeable in a plurality of different relative positions to each other thus, so that a length of said tube element (2), taken in said line direction (21), is adjustable,
wherein said first tube element piece (23) can be inserted into said second tube element piece (24) and is guided therein displaceable to enable said displaceability,
providing a locking device (26, 32; 51, 61) which locks said displaceability of said tube element pieces (23, 24) in said relative positions,
wherein a locking ring (26, 91) is provided as said locking device (26, 32; 51, 61), which locking ring can be brought into a locking position for locking said displaceability of said tube element pieces, in which locking position said locking ring (26, 91) defines the relative position of said first (23) and said second tube element piece (24),
pouring a hardenable material which encloses said tube element (2) after the hardenable material has hardened,
wherein, in said locking position, said locking ring (26, 91) tensions said second tube element piece (24) inwards onto said first tube element piece (23), and
wherein said tube element (2) is closed at both ends, wherein a ventilation channel is opened between two relative positions respectively for simplifying said displaceability of said tube element pieces.

12. The method according to claim 11, wherein a contact collar (61) provided at said second tube element piece (24) and projecting inwards contacts said first tube element piece (23), wherein a contact area between said contact collar (61) and said first tube element piece (23) extends continuously with respect to the circumferential direction in said relative positions but is interrupted between said relative positions for forming said ventilation channel.

13. The method according to claim 12, wherein a ventilation groove (81) having an extension in said line direction (21) is provided on the outside of said first tube element piece (23), said ventilation groove (81) extending in said line direction (21) between said relative positions and into the latter, wherein said ventilation groove (81) interrupts said contact area between said relative positions and defines said ventilation channel, and wherein said contact collar (61) lies at the bottom of said ventilation groove (81) in said relative positions so that said contact area extends continuously.

14. A method for using a duct (1) for an insertion into a wall or floor element and for feeding through a line,
providing said duct (1) comprising a tube element (2) which is provided for extending through said wall or floor element in a line direction (21),
wherein said tube element (2) comprises a first tube element piece (23) and a second tube element piece (24), said tube element pieces (23, 24) being displaceable with respect to each other in said line direction (21) and being arrangeable in a plurality of different relative positions to each other thus, so that a length of said tube element (2), taken in said line direction (21), is adjustable,
wherein said first tube element piece (23) can be inserted into said second tube element piece (24) and is guided therein displaceable to enable said displaceability,
providing a locking device (26, 32; 51, 61) which locks said displaceability of said tube element pieces (23, 24) in said relative positions,
wherein a locking ring (26, 91) is provided as said locking device (26, 32; 51, 61), which locking ring can be brought into a locking position for locking said displaceability of said tube element pieces, in which locking position said locking ring (26, 91) defines the relative position of said first (23) and said second tube element piece (24), wherein said locking ring (91) can be moved into said locking position by a screwing movement, a corresponding screwing guidance (102) being provided on an outside of at least one of said first (23) and said second tube element piece (24), pouring a hardenable material which encloses said tube element (2) after the hardenable material has hardened, wherein, in said locking position, said looking ring (26, 91) tensions said second tube element piece (24) inwards onto said first tube element piece (23), wherein an outer surface (31) extends, in a tensioning section (32) of said second tube element piece (24), obliquely outwards with respect to a direction defining a distance to a centre axis of said line so that said locking ring (26) tensions said tensioning section (32) of said second tube element piece (24) increasingly inwards when said locking ring is moved into said locking position.

* * * * *

UNITED STATES PATENT AND TRADEMARK OFFICE
CERTIFICATE OF CORRECTION

PATENT NO. : 9,909,328 B2
APPLICATION NO. : 15/113522
DATED : March 6, 2018
INVENTOR(S) : Ralf Kurz Page 1 of 3

It is certified that error appears in the above-identified patent and that said Letters Patent is hereby corrected as shown below:

In the Claims

Replace Claim 1 with the corrected claim as follows:
1. A method for using a duct (1) for an insertion into a wall or floor element and for feeding through a line,
    providing said duct (1) comprising a tube element (2) which is provided for extending
        through said wall or floor element in a line direction (21),
        wherein said tube element (2) comprises a first tube element piece (23) and a second
            tube element piece (24), said tube element pieces (23, 24) being displaceable
            with respect to each other in said line direction (21) and being arrangeable in
            a plurality of different relative positions to each other thus, so that a length of
            said tube element (2), taken in said line direction (21), is adjustable,
    wherein said first tube element piece (23) can be inserted into said second tube element piece
        (24) and is guided therein displaceable to enable said displaceability,
    providing a locking device (26, 32; 51, 61) which locks said displaceability of said tube
        element pieces (23, 24) in said relative positions,
        wherein a locking ring (26, 91) is provided as said locking device (26, 32; 51, 61),
            which locking ring can be brought into a locking position for locking said
            displaceability of said tube element pieces, in which locking position said
            locking ring (26, 91) defines the relative position of said first (23) and said
            second tube element piece (24),
    pouring a hardenable material which encloses said tube element (2) after the hardenable
        material has hardened,
    wherein, in said locking position, said locking ring (26, 91) tensions said second tube element
        piece (24) inwards onto said first tube element piece (23).

Replace Claim 9 with the corrected claim as follows:
9. A method for using a duct (1) for an insertion into a wall or floor element and for feeding through a line, Signed and Sealed this
Twelfth Day of June, 2018

Andrei Iancu
*Director of the United States Patent and Trademark Office* providing said duct (1) comprising a tube element (2) which is provided for extending
through said wall or floor element in a line direction (21),
wherein said tube element (2) comprises a first tube element piece (23) and a second
tube element piece (24), said tube element pieces (23, 24) being displaceable
with respect to each other in said line direction (21) and being arrangeable in
a plurality of different relative positions to each other thus, so that a length of
said tube element (2), taken in said line direction (21), is adjustable,
wherein said first tube element piece (23) can be inserted into said second tube
element piece (24) and is guided therein displaceable to enable said
displaceability,
providing a locking device (26, 32; 51, 61) which locks said displaceability of said tube
element pieces (23, 24) in said relative positions,
wherein a locking ring (26, 91) is provided as said locking device (26, 32; 51, 61),
which locking ring can be brought into a locking position for locking said
displaceability of said tube element pieces, in which locking position said
locking ring (26, 91) defines the relative position of said first (23) and said
second tube element piece (24),
wherein said locking ring (26) is guided displaceable on an outside of the second tube
element piece (24) and can be moved from a position which allows the
displaceability of said tube element pieces (23, 24) into a locking position by
just moving said locking ring in said line direction (21),
pouring a hardenable material which encloses said tube element (2) after the hardenable
material has hardened,
wherein, in said locking position, said locking ring (26, 91) tensions said second tube
element piece (24) inwards onto said first tube element piece (23), and
wherein an outer surface (31) extends, in a tensioning section (32) of said second tube
element piece (24), obliquely outwards with respect to a direction defining a
distance to a centre axis of said line so that said locking ring (26) tensions
said tensioning section (32) of said second tube element piece (24)
increasingly inwards when said locking ring is moved into said locking
position.

Replace Claim 14 with the corrected claim as follows:

14. A method for using a duct (1) for an insertion into a wall or floor element and for feeding through a line,
providing said duct (1) comprising a tube element (2) which is provided for extending
through said wall or floor element in a line direction (21),
wherein said tube element (2) comprises a first tube element piece (23) and a second
tube element piece (24), said tube element pieces (23, 24) being displaceable
with respect to each other in said line direction (21) and being arrangeable in
a plurality of different relative positions to each other thus, so that a length of
said tube element (2), taken in said line direction (21), is adjustable,
wherein said first tube element piece (23) can be inserted into said second tube
element piece (24) and is guided therein displaceable to enable said
displaceability, providing a locking device (26, 32; 51, 61) which locks said displaceability of said tube element pieces (23, 24) in said relative positions,
- wherein a locking ring (26, 91) is provided as said locking device (26, 32; 51, 61), which locking ring can be brought into a locking position for locking said displaceability of said tube element pieces, in which locking position said locking ring (26, 91) defines the relative position of said first (23) and said second tube element piece (24),
- wherein said locking ring (91) can be moved into said locking position by a screwing movement, a corresponding screwing guidance (102) being provided on an outside of at least one of said first (23) and said second tube element piece (24), pouring a hardenable material which encloses said tube element (2) after the hardenable material has hardened,
- wherein, in said locking position, said locking ring (26, 91) tensions said second tube element piece (24) inwards onto said first tube element piece (23), wherein an outer surface (31) extends, in a tensioning section (32) of said second tube element piece (24), obliquely outwards with respect to a direction defining a distance to a centre axis of said line so that said locking ring (26) tensions said tensioning section (32) of said second tube element piece (24) increasingly inwards when said locking ring is moved into said locking position.